(12) United States Patent
Takabe et al.

(10) Patent No.: US 8,689,144 B2
(45) Date of Patent: Apr. 1, 2014

(54) ELECTRONIC APPARATUS, PROGRAM, AND FOCUS CONTROL METHOD OF ELECTRONIC APPARATUS

(75) Inventors: Masaaki Takabe, Tokyo (JP); Tadao Ogaki, Chiba (JP); Masahiro Torii, Tokyo (JP)

(73) Assignee: Sony Corporation, Tokyo (JP)

( * ) Notice: Subject to any disclaimer, the term of this patent is extended or adjusted under 35 U.S.C. 154(b) by 1715 days.

(21) Appl. No.: 10/952,767

(22) Filed: Sep. 30, 2004

(65) Prior Publication Data

US 2005/0097479 A1 May 5, 2005

(30) Foreign Application Priority Data

Oct. 16, 2003 (JP) ................ P2003-355972

(51) Int. Cl.
*G06F 3/048* (2013.01)
(52) U.S. Cl.
USPC ........... 715/853; 715/852; 715/857; 715/858; 715/860; 715/862
(58) Field of Classification Search
USPC ......... 715/851, 812, 824, 822, 823, 784, 785, 715/786, 787, 581, 612, 613, 614, 698, 694, 715/858, 856, 857, 860, 862
See application file for complete search history.

(56) References Cited

U.S. PATENT DOCUMENTS

| | | | | |
|---|---|---|---|---|
| 5,594,847 A | * | 1/1997 | Moursund | 345/645 |
| 5,673,087 A | * | 9/1997 | Choi et al. | 348/511 |
| 5,677,708 A | * | 10/1997 | Matthews et al. | 345/684 |
| 5,757,358 A | * | 5/1998 | Osga | 715/862 |
| 5,838,386 A | * | 11/1998 | Kim | 348/569 |
| 6,075,531 A | * | 6/2000 | DeStefano | 715/788 |
| 6,154,205 A | * | 11/2000 | Carroll et al. | 345/684 |
| 6,295,057 B1 | | 9/2001 | Rosin et al. | |
| 6,785,865 B1 | * | 8/2004 | Cote et al. | 715/513 |
| 7,509,592 B1 | * | 3/2009 | Martinez | 715/862 |
| 7,757,252 B1 | * | 7/2010 | Agasse | 725/41 |
| 7,788,601 B2 | * | 8/2010 | Scott | 715/812 |
| 8,352,986 B2 | * | 1/2013 | Uchida et al. | 725/48 |
| 8,418,208 B2 | * | 4/2013 | Ellis et al. | 725/60 |
| 2002/0067433 A1 | * | 6/2002 | Yui et al. | 348/588 |
| 2002/0154896 A1 | * | 10/2002 | Maruyama et al. | 386/95 |

FOREIGN PATENT DOCUMENTS

| | | |
|---|---|---|
| GB | 2 336226 | 10/1999 |
| GB | 2 370 739 | 7/2002 |
| GB | 2 370 740 | 7/2002 |

(Continued)

OTHER PUBLICATIONS

Akamatsu; Touch with a Mouse. A Mouse type Interface Device with Tactile and Force Display; © 1994; IEEE; 5 pages.*

(Continued)

*Primary Examiner* — Linh K Pham

(74) *Attorney, Agent, or Firm* — Rader, Fishman & Grauer PLLC

(57) ABSTRACT

The present invention provides an electronic apparatus having a superiority in a selecting operation to an object. When contents of documents having a plurality of objects are displayed, a default focus is automatically given to one object located near to a display center by a focus control program. When the display is scrolled by cursor keys of a remote controller, objects to be given the focus are sequentially changed in conjunction with the scroll.

16 Claims, 9 Drawing Sheets

(56) References Cited

FOREIGN PATENT DOCUMENTS

| | | |
|---|---|---|
| JP | 09-016315 A | 1/1997 |
| JP | 2003-060593 | 2/2003 |
| WO | WO 01/44914 | 6/2001 |
| WO | WO 03/023590 | 3/2003 |
| WO | WO 03/079661 | 9/2003 |

OTHER PUBLICATIONS

GB Search and Examination Report Feb. 24, 2005.

* cited by examiner

F I G. 2
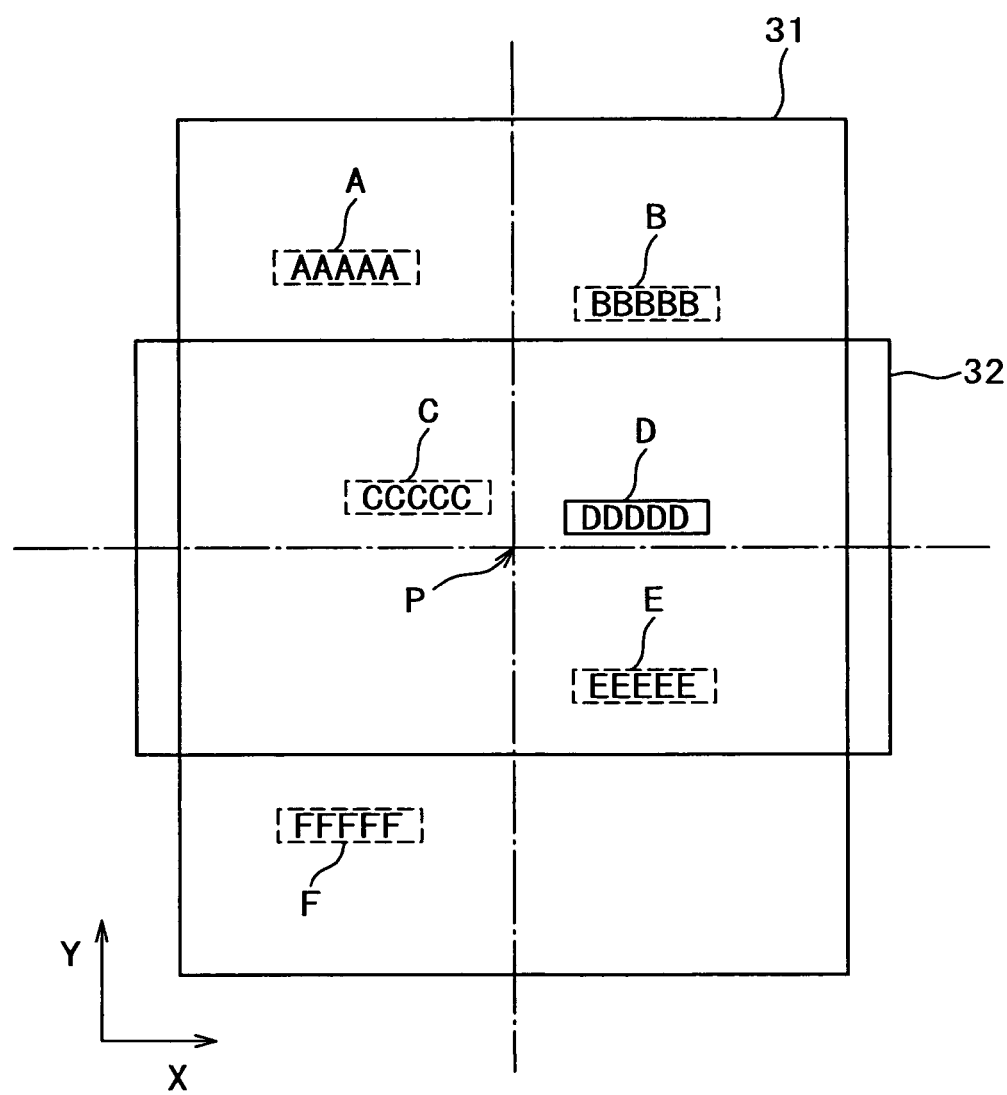

F I G. 6
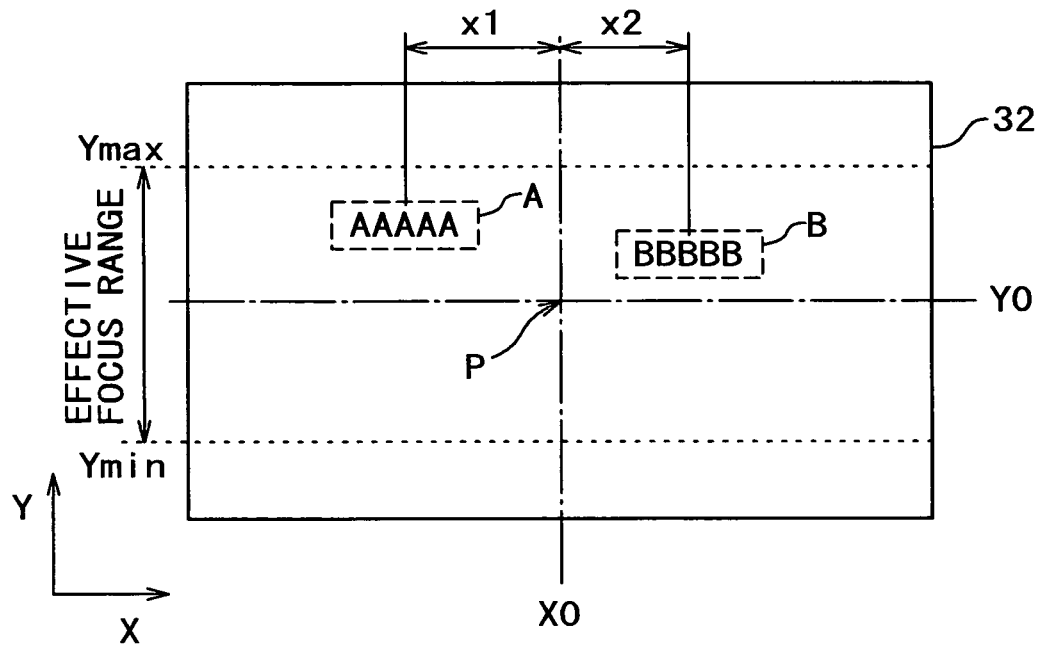
F I G. 7
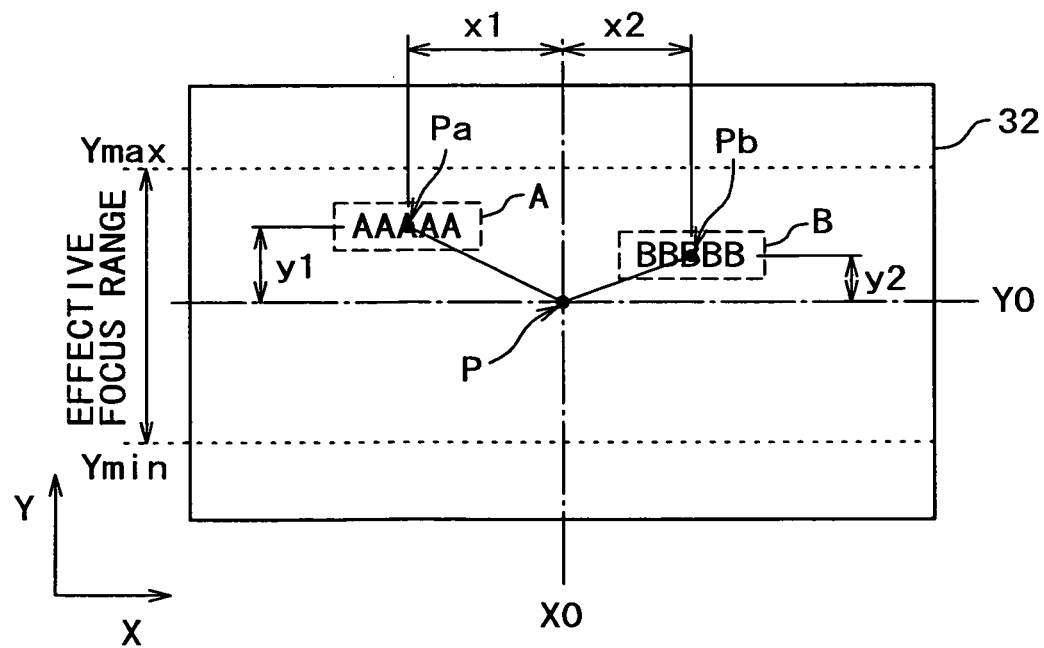

ELECTRONIC APPARATUS, PROGRAM, AND FOCUS CONTROL METHOD OF ELECTRONIC APPARATUS

CROSS REFERENCE TO RELATED APPLICATION

This application claims priority from Japanese Priority Document No. 2003-355972, filed on Oct. 16, 2003 with the Japanese Patent Office, which document is hereby incorporated by reference.

BACKGROUND OF THE INVENTION

1. Field of the Invention

The present invention relates to various electronic apparatuses each having functions of displaying a document on a display, selecting an arbitrary object contained in the displayed document, and accepting a user input for the selected object, a program, and a focus control method of the electronic apparatus.

2. Description of the Related Art

An electronic apparatus such as a television set, a PDA (Personal Digital (Data) Assistance) and a mobile phone has functions of reading a document through a network such as a World Wide Web or a local storage unit, analyzing the document, and displaying the document. When the displayed document contains a plurality of hyper-linked objects, a user operates cursor keys or a jog dial provided on the apparatus, moves a focus to a position of the object, and carries out accessing of a linked destination of the object by the above selection and the determination operations.

Also, a Patent Document 1 describes a technology, wherein an up/down and left/right keys are operated when a user selects a menu desired by the user among menus displayed on a display in an apparatus for receiving a BS digital data broadcast. Further, in the above Patent Document 1, a mouse is used to eliminate a problem that when the focus is moved to the desired menu through an operation of the up/down and left/right keys of the remote controller, a presence of a large number of other menus between a presently focused menu and the desired menu requires that the key has to be pressed several times, resulting in an inferior operability. See Patent Document 1: Japanese Laid-open Patent No. 2003-60593, for example.

SUMMARY OF THE INVENTION

Most of the electronic apparatuses such as the television set, the PDA (Personal digital (Data) Assistance) and the mobile phone are mainly mounted with cursor keys as a pointing device. The cursor keys, although being largely inferior to the mouse etc. in a degree of freedom of the selection on a plane, requires no operation space, and besides, the cursor keys are inexpensive, so that a remarkably extensive use of the cursor keys is acceptable.

However, the cursor keys are not suited for the selection of the objects contained in a discrete arrangement in the displayed document, in which case, a frequently repeated operation has been required to move the focus to a desired object, for instance.

In view of the above circumstances, the present invention is intended to provide an electronic apparatus that is superior in object selecting operability, and also a program and a focus control method of the electronic apparatus, wherein the object selecting operability may be substantially increased.

To solve the above problems, an electronic apparatus according to the present invention comprises a display unit for displaying contents of a document containing one or more objects being selectable by a user, and focusing means for determining an object nearest to a height of a center position of the document in a display range displayed by the display unit and setting the determined object to be a user input-acceptable focus condition.

The object nearest to the height of the center position of the document in the display range thereof is automatically set to the focus condition, so that a scroll operation with the cursor key, for instance, is merely required for a user to realize an object-to-object move of the focus. Hereby, the object selecting operability may be increased.

The focusing means in the electronic apparatus of the present invention detects the objects contained in a predetermined effective focus range displayed on the display unit. In this case, when two or more objects are detected, the focusing means calculates a height position of each detected object from the center of the display, and also calculates a difference in height between two objects having the calculated height positions nearest to each other, wherein when the calculated difference exceeds a prescribed margin, the object nearest to the center height position of the display is set to the focus condition, and conversely, when the calculated difference falls within the prescribed margin, the object to be set to the focus condition between the two objects is determined in consideration of a horizontal position on the display unit.

More specifically, the object nearest to the center of the display may be set to the focus condition by setting, to the focus condition, the object having a smallest horizontal distance from the center of the display between the two objects having the calculated difference within the prescribed margin.

Further, the move of the focus is regularized by determining, in sequence according to a priority determined in a horizontal position relation of the display, the object to be set to the focus condition between the two objects having the calculated difference within the prescribed margin, so that an intuitive object selecting operation for the user is realized.

Furthermore, the focusing means repeats the determination of the object to be set to the focus condition depending on a scroll event of the document displayed on the display unit, so that the object-to-object move of the focus is realized in cooperation with the scroll operation.

According to the present invention, the selection of the objects contained in the discrete arrangement in the display document may be performed mainly by the scroll operation, resulting in a substantial increase of the operability.

BRIEF DESCRIPTION OF THE ATTACHED DRAWINGS

FIG. 2 is a view showing an instance of a display document containing a plurality of hyper-linked objects;

FIG. 6 is a view for illustrating a method of selecting an object to be focused in consideration of an X-coordinate position;

FIG. 7 is a view for illustrating a method of selecting an object to be focused based on a distance between the coordinates of the center of each object and the coordinates of a display center;

DETAILED DESCRIPTION OF THE PREFERRED EMBODIMENTS

One of the embodiments of the present invention is hereinafter described in detail with reference to the accompanying drawings.

Figure 1:
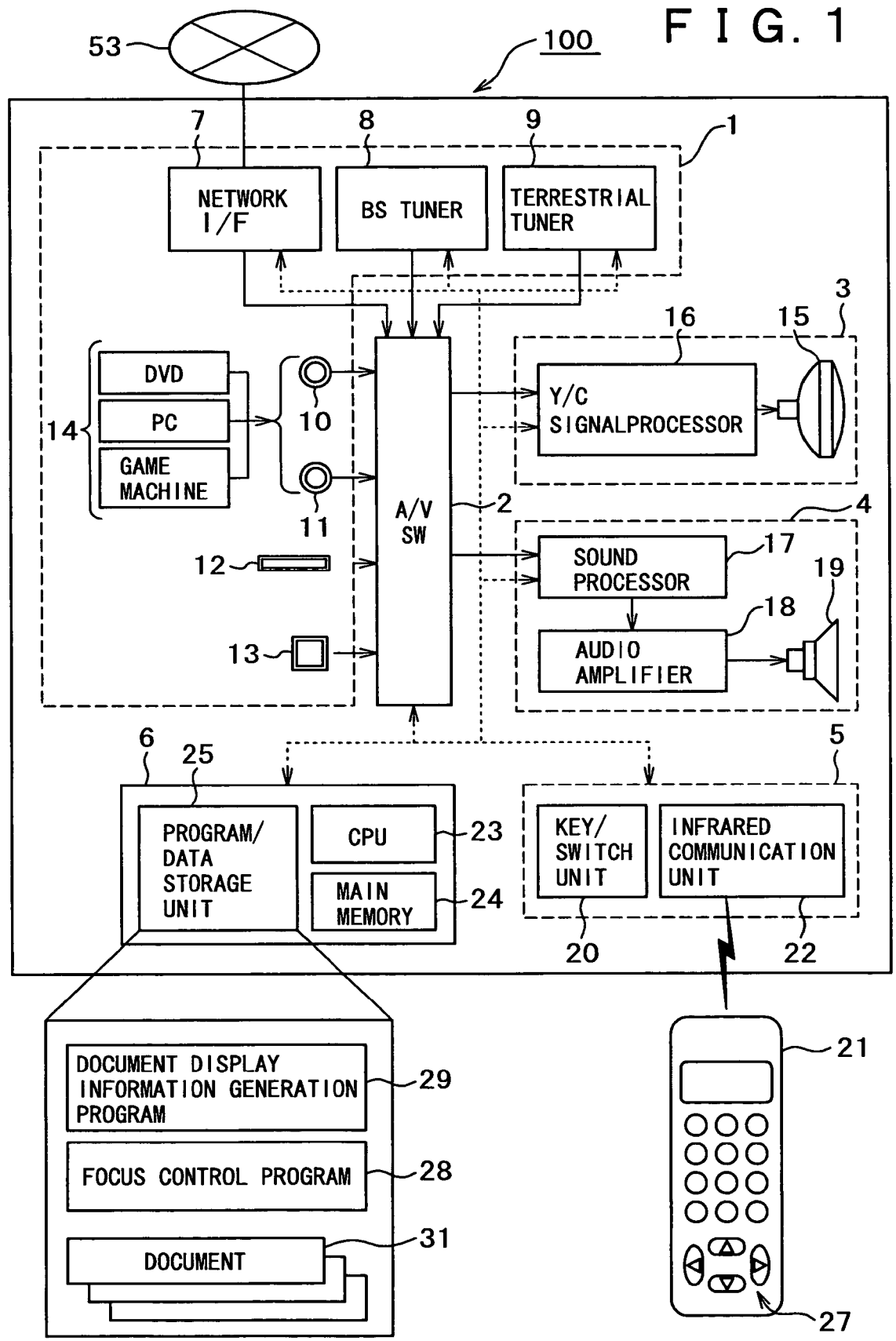
FIG. 1 is a view showing a configuration of a television set available as one embodiment of the present invention.

FIG. 1 is a view showing a configuration of a television set available as one embodiment of the present invention.

As shown in FIG. 1, a television set 100 as the embodiment is composed of an interface 1, an A/V SW 2, a video unit 3, an audio unit 4, an operation input unit 5, a control unit 6, etc. The interface 1 includes a network interface 7 available as means for connection with a network 53 such as a World Wide Web, a BS tuner 8 for receiving a BS broadcast, a terrestrial tuner 9 for receiving a terrestrial broadcast, a video input terminal 10, an audio input terminal 11, a memory card slot 12 for performing a reading and a writing of a memory card, an i.LINK (a DV terminal) 13, etc.

Video data and audio data, etc. supplied from an externally connected apparatus 14 such as a DVD (Digital Versatile Disc) recorder/player, a PC (Personal Computer), and a game machine are supplied through the video input terminal 10 and the audio input terminal 11.

The A/V SW 2 performs an input selection, etc. between the video data and the audio data supplied from each apparatus through the interface 1.

The video unit 3 is composed of a display 15 such as a CRT (Cathode Ray Tube) and a LCD (Liquid Crystal Display), and a Y/C signal processor 16 for generating a video signal displayable on the display 15 based on the video data selected by the A/V SW 2.

The audio part 4 is composed of a sound processor 17 for processing the audio data selected by the A/V SW 2, an audio amplifier 18 for amplifying an output of the sound processor 17, and a speaker 19 for outputting an amplified audio signal in a hearing sensational manner.

The operation input unit 5 is available as means for processing various user operation inputs, and is composed of a key/switch unit 20 provided on a television set body, and an infrared communication unit 22 for performing an IR (Infrared) radio communication with a remote controller 21.

The control unit 6 is composed of a CPU (Central Processing Unit) 23, a main memory 24, a program/data storage unit 25, etc. The CPU (Central Processing Unit) 23 performs various operational processing and controls using the main Memory 24 as a working space, based on a program and data stored in the program/data storage unit 25, the input, etc. from the operation input unit 5. The main memory 24 is a random read/write high-speed memory such as a RAM (Random Access Memory), for instance. The program/data storage unit 25 is a read-only or a read/write nonvolatile memory such as a ROM (Read Only Memory), a flash ROM, and a disk drive, for instance.

The program/data storage unit 25 contains a document 31 such as a PDF (Portable Document Format) format, a HTML (Hyper Text Makeup Language) format, and an XML (extensible Makeup Language) format specified as an object of a display processing in the television set 100, a document display information generation program 29 for generating display information by analyzing a source of the document 31 of various formats, a focus control program 28 for applying a focus on the user interface to hyper-linked objects contained in a document displayed on the display 15 to perform a control for an object-to-object move of the focus depending on a display document scroll within the display, etc. Here, the focus refers to a condition in which one of the hyper-linked objects on the displayed document is displayed as a presently selectable object such as to be capable of being discriminated from other objects visually by means of a change in color, or an inversion, etc., for instance. When an entry of an instruction to perform the selection is given by the user through the key/switch unit 20 or the remote controller 21, access to document information at a linked destination is caused based on hyperlink information set to the object that is focused at that time.

Incidentally, the document information is obtainable by capturing from not only the program/data storage unit 25 but also through the network interface 7 from the network such as the World Wide Web. Further, it is also allowable to perform a display processing of the document information described in a BML (Broadcast Makeup Language) format that meets with the BS digital data broadcast standards, after the capture through the BS tuner 8.

A focus control in the television set 100 with the focus control program 28 is now described in detail.

FIG. 2 is a view showing an instance of the display document containing a plurality of hyper-linked objects. In the display document 31 shown in FIG. 2, a part of the whole document is displayed on a display surface 32 of the display 15, and the user is supposed to permit a browsing of the whole document through an upward/downward and leftward/rightward scroll operation with the key/switch unit 20 or a cursor key 27 of the remote controller 21.

A definition of a plurality of hyper-linked objects A, B, C, D, E, and F such as character strings and images is given to the display document 31, in which case, when the hyper-linked objects are contained in the display document 31 in a display range on the display surface 32, one object (the object D in the illustrated embodiment) nearest to a display center P among the above objects is automatically selected by the focus control program 28 to ensure that the selected object D is focused. The focused object D is displayed with a display attribute such as a character color changed, for instance, so as to be visually and easily discriminated from other non-focused objects.

Figure 3:
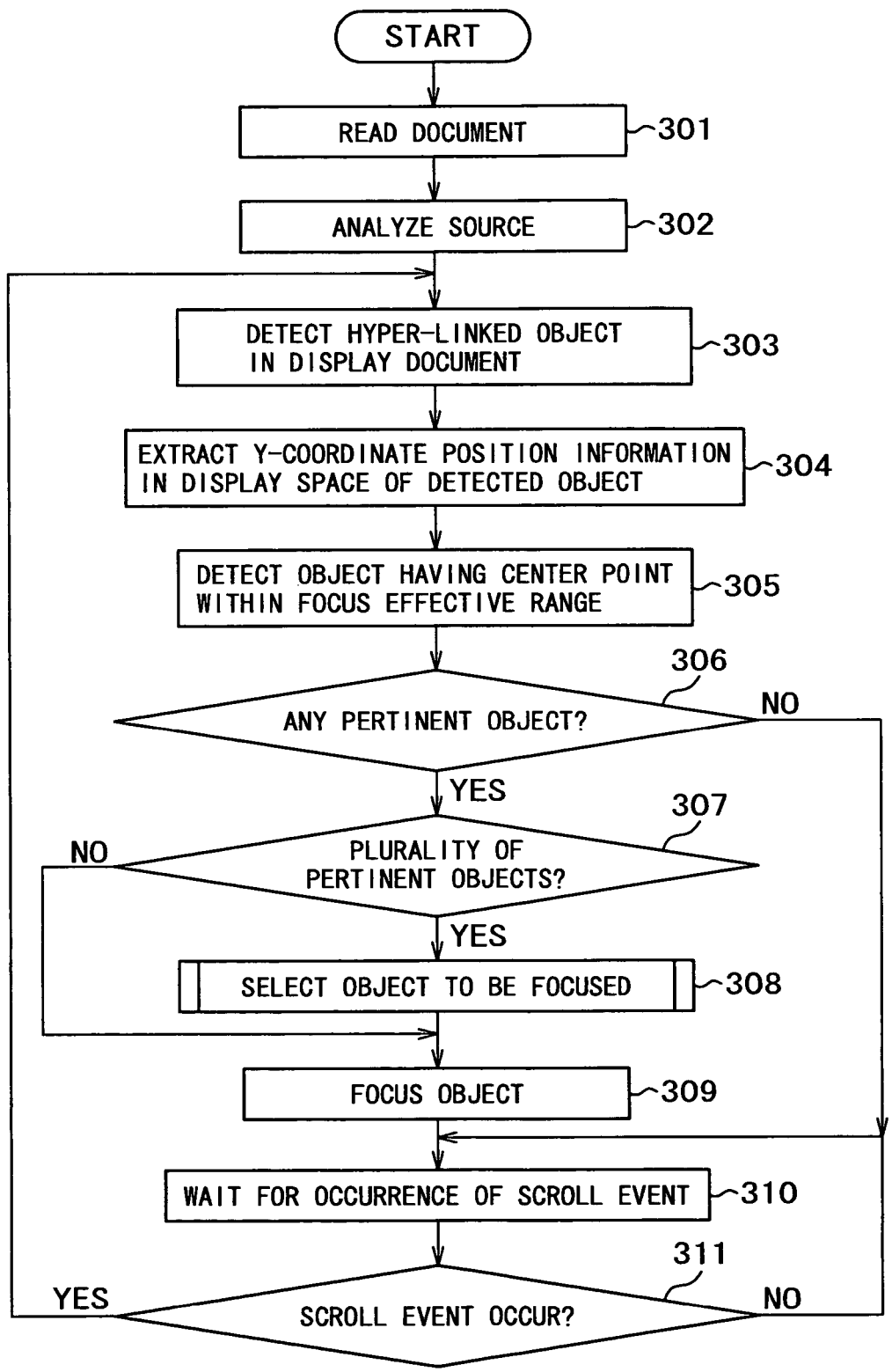
FIG. 3 is a flowchart showing a processing procedure of a focus control program 28.

The focus control program 28 performs the selection of the object to be focused according to a following processing procedure. FIG. 3 is a flowchart showing the processing procedure of the focus control program 28.

Firstly, the focus control program 28 reads the document information to be displayed at Step 301, and performs a source analysis at Step 302. The source analysis allows the hyper-linked objects contained in the document in the range being displayed on the display to be detected at Step 303.

Figure 4:
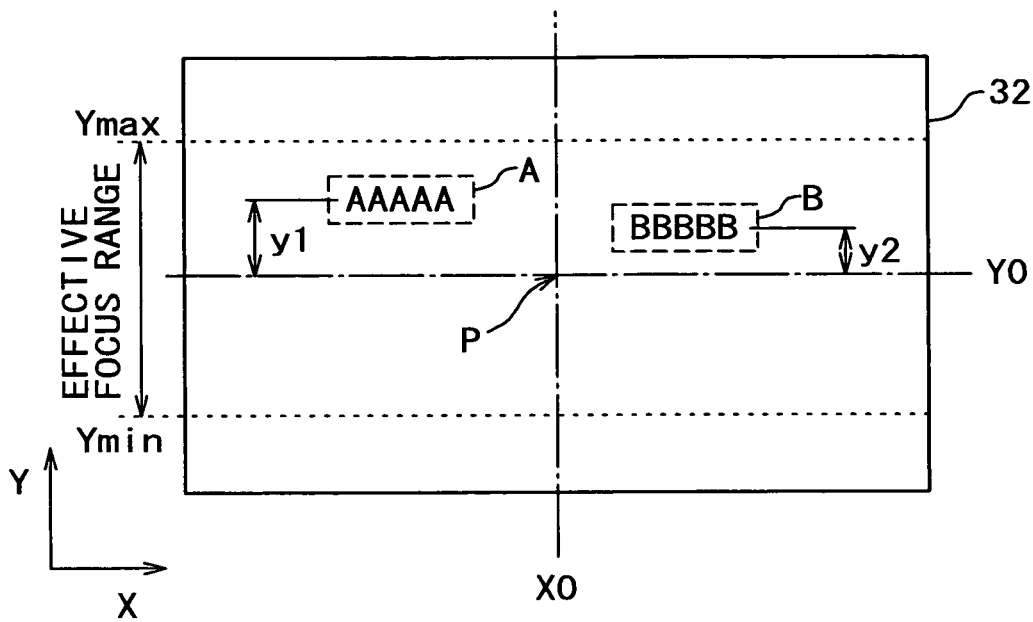
FIG. 4 is a view showing an instance of a display of a document containing two objects.

Here, as shown in FIG. 4, the display of the document containing two objects A and B is given as an instance. In this case, Y-coordinate position information in a display space is extracted from each of the detected objects A and B at Step 304. The Y-coordinate position information extracted here in is obtainable as distances y1 and y2 from Y coordinates (Y0) of the display center P to the centers of the objects A and B.

In the case of a document in the PDF format, for instance, the Y-coordinate position information of the individual objects A and B may be calculated from individual object layout information described in the source, the position information of the presently displayed document, etc.

The focus control program 28 states that a range put between Y coordinates Y max and Y min at positions respectively spaced from the Y coordinates (Y0) of the display center P by a prescribed distance in a plus direction and a minus direction is specified as an effective focus range, so that a detection of the object having a center point within the effective focus range is performed at Step 305. In the embodiment shown in FIG. 4, the above two objects A and B are detected as the object having the center point within the effective focus range. The absence of any object having the center point within the effective focus range (NO in Step 306) brings in a wait condition for an occurrence of a scroll event at Step 310. In the presence of only one object having the center point within the effective focus range (YES in the Step 306→NO in Step 307), this one object is focused at Step 309. Further, in the presence of a plurality of objects respectively having the center points within the effective focus range (YES in the Step 307), which object is focused is selected as follows at Step 308, and the selected object is focused by default at Step 309.

A method of selecting the object to be focused in the Step 308 is now described.

As shown in FIG. 4, there is described a case where the two objects A and B are contained in the effective focus range, for instance. The Y-coordinate position information of the object A is assumed to be y1, and the Y-coordinate position information of the object B is assumed to be y2. Each position information is given based on the Y coordinates (Y0) of the display center P, so that it may be appreciated that the object (the object B in this embodiment) found to have a smaller value by a comparison between y1 and y2 is the object nearest to the Y coordinates (Y0) of the display center P. The object B is supposed to be focused by default.

While there is described the case where the selection of the object to be focused is performed depending on only the Y-coordinate position of the object, an addition of an X-coordinate position to a selecting requirement is also acceptable. A following method may be offered, for instance.

Figure 5:
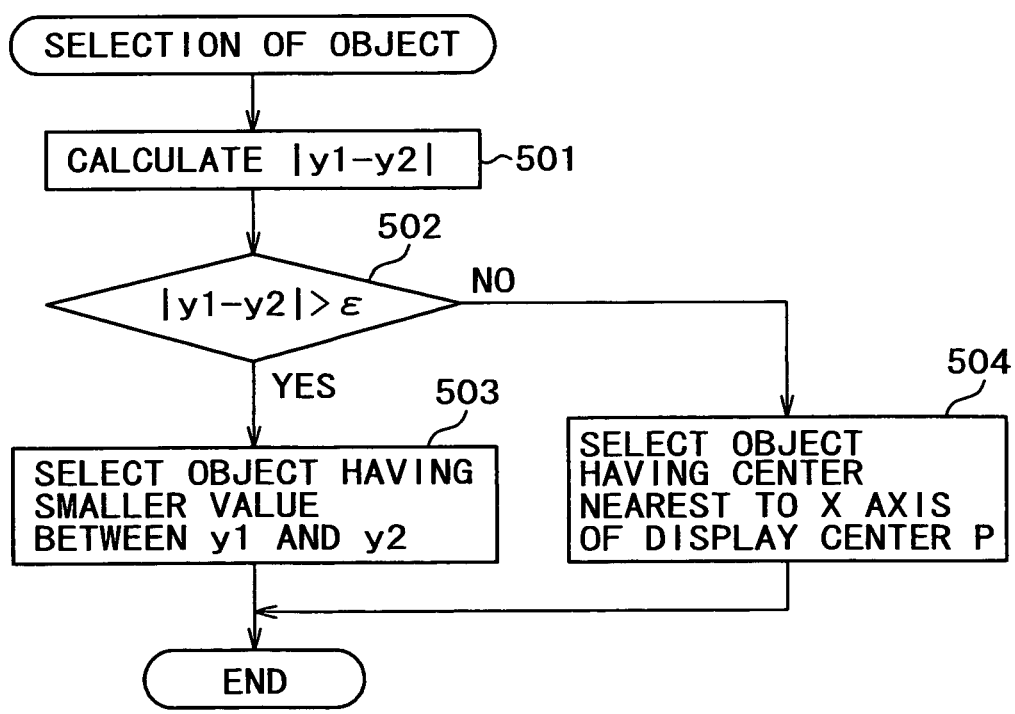
FIG. 5 is a flowchart showing a different processing procedure of selecting an object to be focused.

FIG. 5 is a flowchart showing a processing procedure in this case.

Firstly, a difference between y1 specified as the Y-coordinate position information of the object A and y2 specified as the Y-coordinate position information of the object B is calculated at Step 501, and it is determined whether or not the calculated difference falls within a prescribed margin $\epsilon$ at Step 502. When the difference is larger than the prescribed margin $\epsilon$, the object found to have the smaller value by the comparison between y1 and y2 is selected as the object to be focused at Step 503.

Conversely, when the difference falls within the prescribed margin 6, the two objects A and B nearest to the Y coordinates (Y0) of the display center P are referred to as shown in FIG. 6, and distances x1 and x2 from X coordinates (X0) of the display center P to the center points of the above two objects A and B are calculated this time to obtain X-coordinate position information of the objects A and B. Then, the object found to have a smaller value by the comparison between the calculated distances x1 and x2 is determined as the object to be focused. In this manner, it is also allowable to perform the selection of the object to be focused not only depending on the Y-coordinate position of the object but also in consideration of the X-coordinate position thereof.

Furthermore, as shown in FIG. 7, distances z1 and z2 from the coordinates of centers Pa and Pb of the objects A and B contained in the effective focus range to the coordinates of the display center P may be also respectively calculated to focus the object having a smaller distance.

In the embodiment shown in FIG. 7, the distance z1 from the coordinates of the center Pa of the object A to the coordinates of the display center P may be calculated by a following expression (1).

$$z1=(x1^2+y1^2)^{1/2} \qquad (1)$$

Likewise, the distance z2 from the coordinates of the center Pb of the object B to the coordinates of the display center P may be also calculated by a following expression (2).

$$z2=(x2^2+y2^2)^{1/2} \qquad (2)$$

Then, the object having the smaller value between z1 and z2 is determined as the object to be focused. In the embodiment, the object B is determined as the object to be focused.

The above-described focus control is repeated on each occasion of the occurrence of the scroll event at Step 311. More specifically, it is preferable that a repetition of the focus control at every occurrence of a predetermined amount of scroll is performed not to apply an excessive load caused by the focus control to the CPU.

Thus, the upward or downward scroll operation permits the focus to be moved in sequence between the plurality of objects contained in the document.

Figure 8:
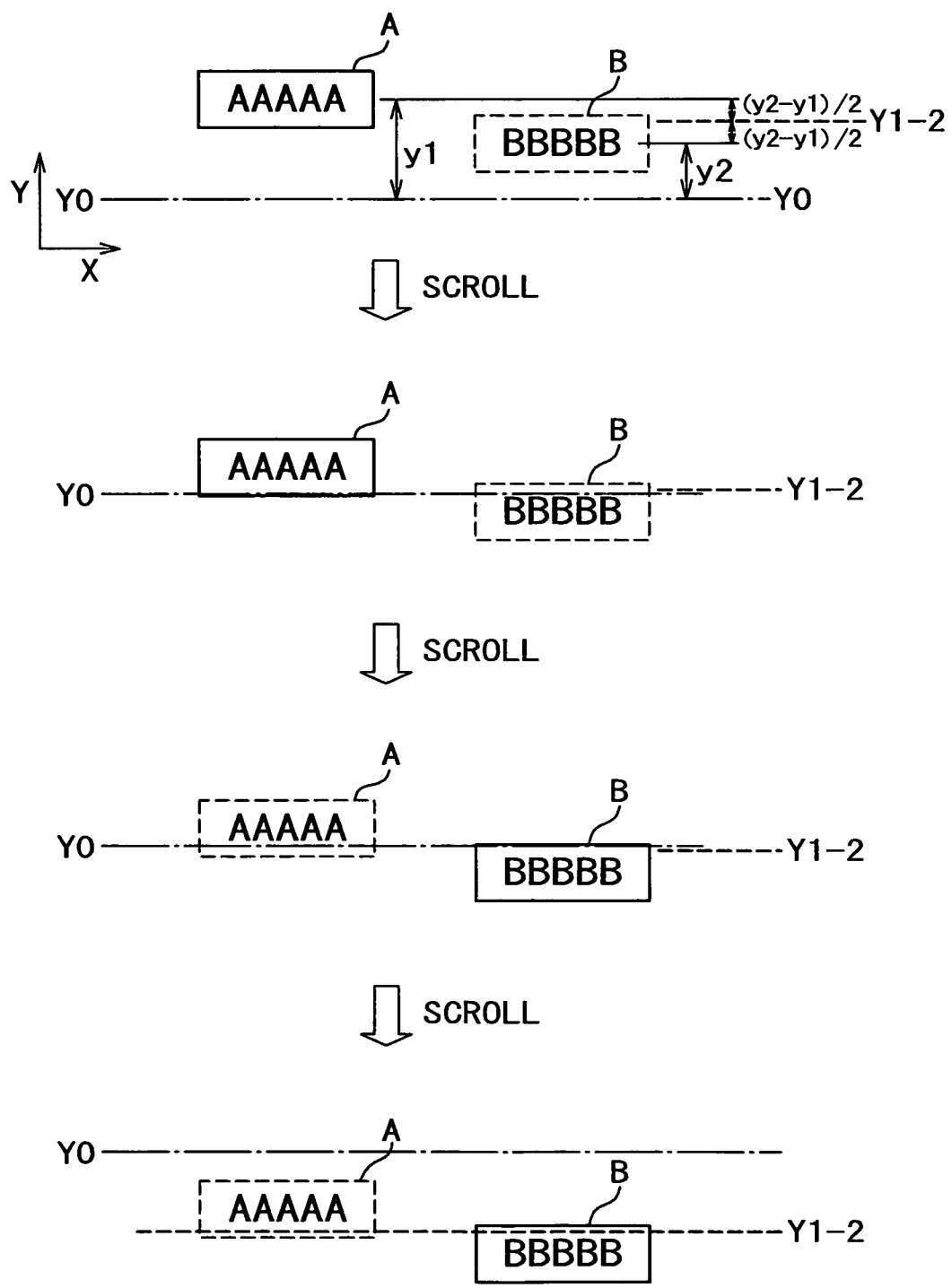
FIG. 8 is a view for illustrating an object selecting method for focusing two objects sequentially in a uniform time division manner with a scroll.
Figure 9:
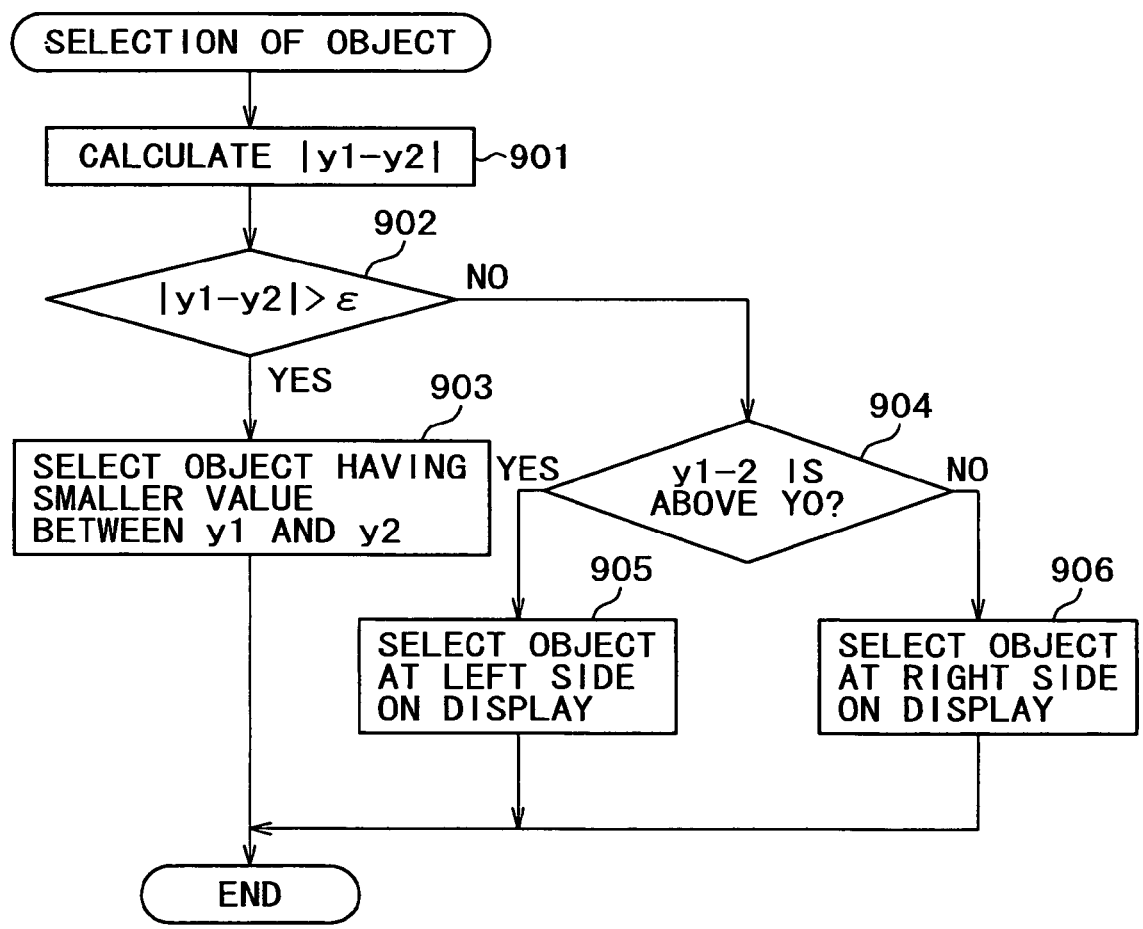
FIG. 9 is a flowchart showing a procedure of the object selecting method of FIG. 8.

An object selecting method for focusing each object sequentially in a uniform time division manner when performing the object-to-object move of the focus sequentially through the upward or downward scroll operation is now described with reference to FIGS. 8 and 9.

Firstly, the difference between y1 specified as the Y-coordinate position information of the object A and y2 specified as the Y-coordinate position information of the object B is calculated at Step 901, and it is determined whether or not the calculated difference falls within the prescribed margin $\epsilon$ at Step 902. When the difference is larger than the prescribed margin $\epsilon$, the object found to have the smaller value by the comparison between y1 and y2 is selected as the object to be focused at Step 903.

Conversely, when the difference falls within the prescribed margin $\epsilon$, it is determined whether intermediate Y coordinates (Y1-2) of the Y coordinates of the centers of the two objects A and B are above or below the Y coordinates (Y0) of the display center P at Step 904. When the result is that the intermediate Y coordinates (Y1-2) are above the Y coordinates (Y0) of the display center P, the object A at a left side on the display is selected as the object to be focused at Step 905, and conversely, when being below, the object B at a right side on the display is selected as the object to be focused at Step 906.

Thus, the object A at the left side on the display is focused until the scroll of the display brings the intermediate Y coordinates to the position of the Y coordinates of the display center P, and when the intermediate Y coordinates (Y1-2) of the document exceed the Y coordinates (Y0) of the display center P, the focus is supposed to be moved to the object B at the right side on the display. Thus, with the downward scroll, the two objects A and B nearest to each other with the Y-coordinate positions contained in the margin are focused in the uniform time division manner so as to move the focus from the object at the left side to the object at the right side in conformity with a direction of laterally written Japanese or English spelling. It is to be understood that the order of moving the focus from the left to the right is of course that given as one instance, and it is also allowable to switch sequentially the object to be focused from the right to the left depending on an environmental or conditional difference.

Further, when the two objects have exactly a same height, the move of the focus is supposed to be preformed from one object to the other with the center of each object as a border.

Furthermore, when three or more objects are contained in the difference margin ϵ of the Y-coordinate position such as the case of the three or more objects having exactly a same height, the selection of the object to be focused is performed as follows.

Figure 10:
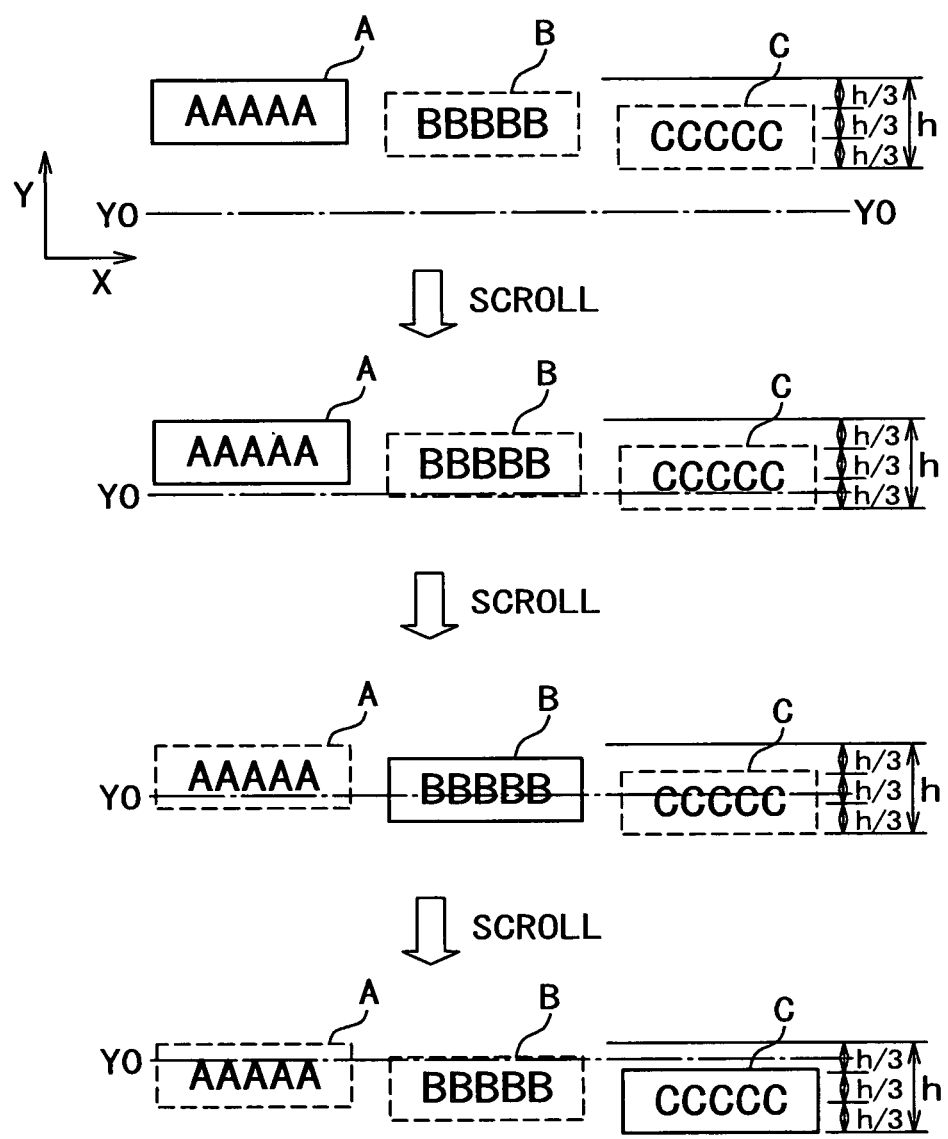
FIG. 10 is a view for illustrating an object selecting method for focusing three or more objects sequentially in the uniform time division manner with the scroll.
Figure 11:
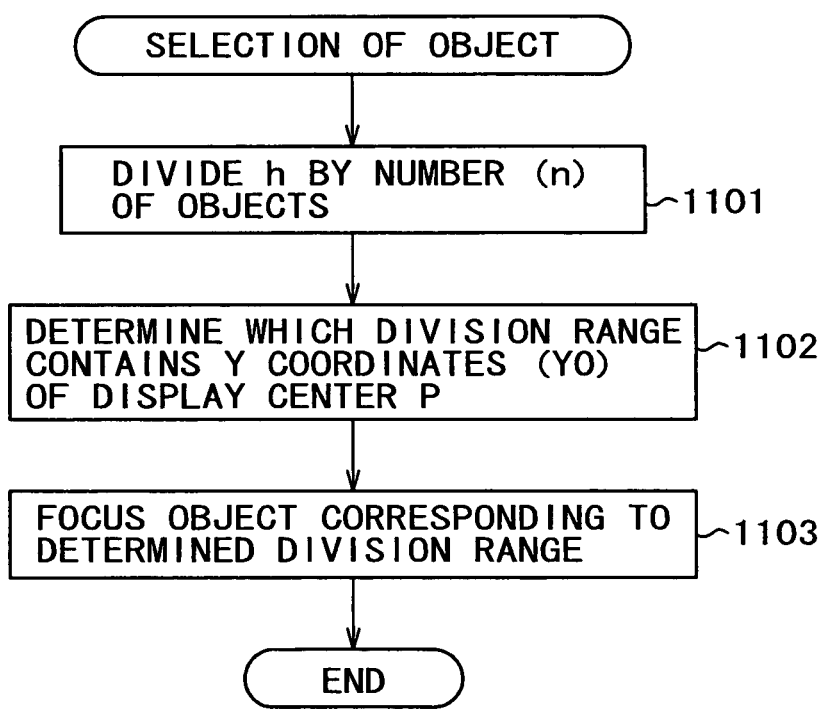
FIG. 11 is a flowchart showing a procedure of the object selecting method of FIG. 10.

An object selecting operation in this case is described with reference to FIGS. 10 and 11.

A Y-axial length h in which n pieces (three in this embodiment) of objects A, B, and C occupy is divided by the number of objects (n) at Step 1101, and it is determined which division range contains the Y coordinates (Y0) of the display center P at Step 1102. Then, the object corresponding to the determined division range is focused at Step 1103. In this case, the move of the focus is also supposed to be performed in sequence from the object at the left side to the object at the right side with the downward scroll. It is to be understood that the order of moving the focus from the left to the right is of course that given as one instance, and it is also allowable to switch sequentially the object to be focused from the right to the left depending on the environmental or conditional difference.

As described in the foregoing, according to the above embodiment, one object nearest to the display center P is automatically focused by default, and the scroll of the display through the operation of the cursor key 27 of the remote controller 21 enables the automatic switching of the object to be focused in sequence. Thus, the operability in selecting the desired object contained in the display document may be increased up to a level equivalent to that in the case of using the pointing device such as the mouse.

Incidentally, the electronic apparatus and the program according to the present invention are not limited to the illustrated embodiment described in the above, and various changes may be of course made in a range of the present invention without departing from the spirit and scope thereof.

What is claimed is:

1. An electronic apparatus comprising:
   a display unit having a display screen for displaying a document thereon, the document having at least two objects being simultaneously displayed on the display screen;
   an invisible reference position fixedly located on the display screen;
   means determining unit for determining which one of the at least two objects displayed on the display screen is located nearest to the invisible reference position; and
   means highlighting unit for highlighting the object determined to be located nearest to the invisible reference position,
   wherein the invisible reference position includes an imaginary horizontal line extending horizontally across the display screen and wherein the determining unit calculates a first distance between one of the at least two objects and the imaginary horizontal line and a second distance between another one of the at least two objects and the imaginary horizontal line and wherein, if the first distance is smaller than the second distance, the highlighting unit highlights the one of the at least two objects and, if the second distance is smaller than the first distance, the highlighting unit highlights the another one of the at least two objects.

2. The electronic apparatus as cited in claim 1, wherein each one of the at least two objects is a hyper-link.

3. The electronic apparatus as cited in claim 2, further comprising means a connection unit for causing connection to the hyper-link wherein, activating the connection unit for causing connection to the hyper-link causes information associated with the highlighted hyper-link to be displayed on the display screen.

4. The electronic apparatus as cited in claim 3, wherein the means connection unit for causing connection to the hyper-link includes an enter key on a computer keyboard or a pushbutton on a computer mouse wherein, pressing the enter key or the pushbutton when the hyper-link is highlighted causes information associated with the highlighted hyper-link to be displayed on the display screen.

5. The electronic apparatus as cited in claim 1, wherein the invisible reference position includes an imaginary vertical line perpendicularly intersecting the imaginary horizontal lines at an imaginary reference point to define an imaginary X-axis extending in a horizontal direction and an imaginary Y-axis extending in a vertical direction.

6. The electronic apparatus as cited in claim 5, wherein the first distance is a first rectilinear distance away from the X-axis in the vertical direction and the second distance is a second rectilinear distance away from the X-axis in the vertical direction and wherein the determining means unit calculates the absolute value of a difference between the first distance and the second distance and compares the calculated absolute value to a predetermined threshold quantity.

7. The electronic apparatus as cited in claim 1, wherein, if the calculated absolute value is greater than the threshold quantity, the highlighting means unit highlights the object closest to the X-axis.

8. The electronic apparatus as cited in claim 7, wherein the determining means unit calculates a third rectilinear distance between the one of the at least two objects and the imaginary Y-axis in the horizontal direction and a fourth rectilinear distance between the another one of the at least two objects and the imaginary Y-axis in the horizontal direction and wherein, if the calculated absolute value is less than the threshold quantity and if the third rectilinear distance is smaller than the fourth rectilinear distance, the highlighting means unit highlights the one of the at least two objects and, if the fourth rectilinear distance is smaller than the third rectilinear distance, the highlighting means unit highlights the another one of the at least two objects.

9. A computer program stored on a non-transitory computer readable medium that, when executed on a computer, performs steps comprising:
   displaying a document on a display screen, the document having at least two objects being simultaneously displayed on the display screen;
   providing an invisible reference position fixedly located on the display screen;
   determining which one of the at least two objects displayed on the display screen is located nearest to the invisible reference position; and
   highlighting the object determined to be located nearest to the invisible reference position,
   wherein the invisible reference position includes an imaginary horizontal line extending horizontally across the display screen and wherein the determining step calculates a first distance between one of the at least two objects and the imaginary horizontal line and a second distance between another one of the at least two objects and the imaginary horizontal line and wherein, if the first distance is smaller than the second distance, the one of the at least two objects is highlighted and, if the second distance is smaller than the first distance, the another one of the at least two objects is highlighted.

10. The computer program as cited in claim 9, wherein each one of the at least two objects is a hyper-link.

11. The computer program as cited in claim 10, further comprising the step of:
   causing connection to the hyper-link thereby causing information associated with the highlighted hyper-link to be displayed on the display screen.

12. The computer program as cited in claim 11, wherein the step for causing connection to the hyper-link includes pressing an enter key on a computer keyboard or a pushbutton on a computer mouse when the hyper-link is highlighted thereby causing the information associated with the highlighted hyper-link to be displayed on the display screen.

13. The computer program as cited in claim 9, wherein the invisible reference position includes an imaginary vertical line perpendicularly intersecting the imaginary horizontal lines at an imaginary reference point to define an imaginary X-axis extending in a horizontal direction and an imaginary Y-axis extending in a vertical direction.

14. The computer program as cited in claim 13, wherein the first distance is a first rectilinear distance away from the X-axis in the vertical direction and the second distance is a second rectilinear distance away from the X-axis in the vertical direction and wherein the determining step calculates the absolute value of a difference between the first distance and the second distance and compares the calculated absolute value to a predetermined threshold quantity.

15. The computer program as cited in claim 14, wherein, if the calculated absolute value is greater than the threshold quantity, the highlighting step highlights the object closest to the X-axis.

16. The computer program as cited in claim 15, wherein the determining step calculates a third rectilinear distance between the one of the at least two objects and the imaginary Y-axis in the horizontal direction and a fourth rectilinear distance between the another one of the at least two objects and the imaginary Y-axis in the horizontal direction and wherein, if the calculated absolute value is less than the threshold quantity and if the third rectilinear distance is smaller than the fourth rectilinear distance, the highlighting step highlights the one of the at least two objects and, if the fourth rectilinear distance is smaller than the third rectilinear distance, the highlighting step highlights the another one of the at least two objects.

\* \* \* \* \*